UNITED STATES PATENT OFFICE.

ARTHUR WALL, OF POPLAR BLACKWALL, ENGLAND.

IMPROVEMENT IN THE MANUFACTURE OF METALS.

Specification forming part of Letters Patent No. 3,698, dated August 10, 1844.

*To all whom it may concern:*

Be it known that I, ARTHUR WALL, of Poplar Blackwall, in the county of Middlesex, England, surgeon, a subject of the Queen of Great Britain, have invented or discovered a certain Improvement or certain Improvements in the Manufacture of Iron, Steel, Copper, and other Metals; and I do hereby declare that the following is a full and exact description thereof.

The nature of my invention consists in the use and agency of electricity in the manufacture of iron, steel, copper, and other metals, the object thereof being to facilitate the malleability and purity of the metals under the process of manufacture, as hereinafter particularly described.

In order to enable others skilled in the manufacture of the said metals to practice my invention, I shall proceed to describe the process to be pursued, and first with reference to the manufacture of iron.

My said invention consists in subjecting the iron while in a fluid state, and also while in the act of congealing or solidification, to a current of electricity, which I cause to traverse as completely as possible throughout the entire metallic mass.

In casting a bar or similar mass I cause the current to traverse from end to end by conductors properly placed for the purpose, and so arranged that when the metal runs into the mold it may be made to complete the circuit of the electric current; or I previously make such arrangement by means of a wire or wires of iron or other metal stretched in or passing from end to end of the mold, so that the electric current may in the first instance be made to traverse the wire around or over which the fused iron is afterward allowed to flow. There are other methods of performing this operation and of making such arrangements as may admit of the melted iron or the iron during its solidification being traversed by or subjected to the influence of the electrical current. The following are instances of the mode in which I effect this in particular cases: If the castings are horizontal, I place at each end of the mold, which I suppose is to be made of sand, clay, or some similar bad conductor or non-conductor of electricity, a piece of clean wrought-iron or other proper conducting metal, which is called the "pole" or "conductor," and I then connect each of these poles or conductors by means of a copper or other wire with the extremities of a galvanic apparatus or voltaic pile or electro-magnetic or other battery of sufficient power for the purpose. I have found that eight pairs of plates of about four by six inches, consisting of alternations of platinum and zinc, arranged in separate cells of nitric acid and dilute sulphuric acid, so as to constitute what is usually denominated "Grove's voltaic battery or apparatus," to be convenient for my purpose and sufficient for a ton of metal, though any of the other forms of the voltaic apparatus or battery or any other source of an adequate electric current, particularly that commonly known by the name of "Smee," and consisting from twenty to thirty pairs of plates of the above size, may be employed with advantage. Having then connected the extremities of the battery with the respective poles or conductors in such a way that when the melted iron is allowed to run into the mold it may so complete the electric circuit as to admit of the castings being traversed from end to end by the electric current, I allow the cast metal to cool and set while in that condition, and as soon as it has entirely set or solidified throughout the connections with the battery may be broken, though I think it is advantageous, particularly in casting ordnance, to continue the electric current for some time after the metal has entirely solidified. When the castings are vertical a similar arrangement is made for the passage of the electric current through the metal, and this I effect by placing at the bottom or sole of the mold a plate or rod of iron or other conducting substance, while a similar conductor is inserted into the upper end of the mold in such a way that the electric circuit may be completed the moment that the mold is filled with the liquid metal.

In applying electricity to iron in a smelting furnace or cupola I insert one rod of wrought-iron in or alongside of the top hole until it comes into contact with the melting metal, and another rod into the upper and posterior part of the hearth, or in at one of the tuyere holes or apertures, until it comes into contact with the surface of the metal, the outer ends of these two rods being placed respectively in connection with the opposite poles of the electric battery, so as to complete the circuit, care being taken not to continue it so long as entirely to decarburate the iron and bring it into a malleable state.

In applying electricity to the iron in the puddling or balling furnace I insert one rod similar to the above into one part of the fused metal, and I attach to one end of another iron rod an insulating-handle, of porcelain, pottery, or other substance not conductive of electricity, and then fix to the end of that iron rod, close to the handle, the conducting-wire from one pole of the voltaic battery, and the other fixed iron rod being connected with the other pole of the battery, I seize the insulated rod by the handle and make its extremity traverse in contact with various points of the iron in its melted state or during its transition into the solid state, thus making the electrical current pass through the metal in every possible direction.

The part of my invention applicable to the manufacture of steel is as follows: The bars of wrought or other iron fit for the manufacture of steel are placed in the usual boxes and furnace, and so far I employ the same means and apparatus commonly called a "converting-furnace," and in common use. But instead of embedding the bars of iron for conversion in common charcoal or in the carbonaceous substances in general use, I employ a mixture of charcoal with the carbonaceous and other matters used by the sugar-refiners, and through which their sirups have been filtered, these residues consisting chiefly of animal-charcoal derived from the combustion of bone and other animal or organic substances, and containing phosphate of lime; and I further add to this mixture a certain quantity of rosin, amounting to about one part of rosin to ten of the mixture, and I further imbue their carbonaceous substances, mixed and prepared as I have described, with a saturated solution of white arsenic in water. Having thus prepared the carbonaceous bed in which the bars of iron intended for conversion into steel are laid and inclosed, as in the modes usually adopted, I next make arrangements for transmitting a current of electricity through the bars after they have been duly converted into blistered steel and while they are still red hot, my object being to transmit such electrical current through each of the bars, together or successively, while cooling down in the furnace. This I effect by attaching an iron, copper, or other proper wire to the ends of the bars and bringing its extremities out of the furnace, so that at the proper time a connection may be made between these wires and those forming the poles or conductors of a voltaic apparatus or pile, and in this way the electric circuit is so completed that the current of electricity may be made, as aforesaid, to traverse the bars for a longer or shorter time. I prefer commencing the transmission of the electricity when the bars have become blistered steel and are red hot in the furnace, and continuing its transmission till they have so far cooled down as to be capable of retaining magnetism.

Now, although I prefer as a source of electricity that form of galvanic or voltaic battery or apparatus known under the name of "Grove's Battery," any other adequate source of electricity may be resorted to; and although I above alluded to blistered steel only, and described my process as applicable to it, I further claim its application to cast-steel; and when thus applied to cast-steel the details of the process I prefer are similar to those which I have specified in regard to the transmission of electricity through cast-iron, my object being the same in regard to the cast-steel as to the cast-iron—namely, to subject it to the influence of an electric current while in fusion and in the act of setting, and to a greater or less extent during the period of its cooling down to common or atmospheric temperature.

As regards the manufacture of copper and other metal, the electric current is to be applied under the process of manufacture in the manner hereinbefore particularly described with reference to the manufacture of iron.

Having thus described the nature of my invention and the manner of performing the same, I hereby declare that what I claim as my invention, and desire to secure by Letters Patent, is—

The improvement in the manufacture of iron, steel, copper, and other metals by the use and application of electricity, as hereinbefore described.

ARTHUR WALL.

Witnesses:
 ALEX. PRINCE,
*Office for Patents, 14 Lincoln's Inn Fields, London.*
 F. W. CAMPIN,
*Clerk to the Above.*